(12) United States Patent
Seegmiller et al.

(10) Patent No.: US 12,043,289 B2
(45) Date of Patent: Jul. 23, 2024

(54) PERSISTING PREDICTED OBJECTS FOR ROBUSTNESS TO PERCEPTION ISSUES IN AUTONOMOUS DRIVING

(71) Applicant: Argo AI, LLC, Pittsburgh, PA (US)

(72) Inventors: Neal Seegmiller, Pittsburgh, PA (US); Ed Venator, Pittsburgh, PA (US); Christopher Cunningham, Pittsburgh, PA (US); Patrick Barone, San Francisco, CA (US); Xi Cai, San Jose, CA (US)

(73) Assignee: Argo AI, LLC, Pittsburgh, PA (US)

( * ) Notice: Subject to any disclaimer, the term of this patent is extended or adjusted under 35 U.S.C. 154(b) by 193 days.

(21) Appl. No.: 17/404,553

(22) Filed: Aug. 17, 2021

(65) Prior Publication Data

US 2023/0054626 A1   Feb. 23, 2023

(51) Int. Cl.
   *B60W 60/00* (2020.01)
(52) U.S. Cl.
   CPC .... *B60W 60/0027* (2020.02); *B60W 60/0011* (2020.02); *B60W 2556/15* (2020.02)
(58) Field of Classification Search
   CPC ......... B60W 60/0027; B60W 60/0011; B60W 2556/15
   See application file for complete search history.

(56) References Cited

U.S. PATENT DOCUMENTS

| | | | |
|---|---|---|---|
| 9,766,626 B1 | 9/2017 | Zhu et al. | |
| 10,059,334 B1 | 8/2018 | Zhu et al. | |
| 10,572,717 B1 | 2/2020 | Zhu et al. | |
| 10,591,919 B1 | 3/2020 | Dolgov et al. | |
| 10,671,076 B1 | 6/2020 | Kobilarov et al. | |
| 10,678,249 B2 | 6/2020 | Yang | |
| 10,691,127 B2 | 6/2020 | Kobilarov et al. | |
| 2009/0140887 A1 | 6/2009 | Breed et al. | |
| 2012/0083960 A1 | 4/2012 | Zhu et al. | |
| 2018/0251126 A1 | 9/2018 | Linscott et al. | |
| 2018/0259957 A1 | 9/2018 | Charrow et al. | |
| 2019/0243371 A1 | 8/2019 | Nister et al. | |
| 2019/0310654 A1 | 10/2019 | Halder | |

(Continued)

OTHER PUBLICATIONS

Extended European Search Report for European Patent Application No. 22190578.9 dated Feb. 27, 2023, 9 pages.

*Primary Examiner* — James J Lee
*Assistant Examiner* — Jonathan E Reinert
(74) *Attorney, Agent, or Firm* — Fox Rothschild LLP

(57) ABSTRACT

Systems and methods for operating an autonomous vehicle (AV) are provided. The method includes detecting one or more objects in an environment, predicting a first set of predicted object trajectories comprising one or more trajectories for each of the detected one or more objects, generating a plurality of candidate AV trajectories for the AV, scoring each of the candidate AV trajectories according to a cost function, using the scoring to select a final AV trajectory for execution, determining which of the predicted object trajectories affected the final AV trajectory and which did not do so, adding the predicted object trajectories that affected the final AV trajectory to a persisted prediction cache, excluding from the persisted prediction cache any predicted object trajectories that did not affect the final AV trajectory, and executing the final AV trajectory to cause the AV to move along the final AV trajectory.

20 Claims, 7 Drawing Sheets

(56) References Cited

U.S. PATENT DOCUMENTS

| | | | |
|---|---|---|---|
| 2019/0382007 A1* | 12/2019 | Casas | G06V 20/58 |
| 2020/0001856 A1 | 1/2020 | Johnson et al. | |
| 2021/0027629 A1* | 1/2021 | Tao | G08G 1/166 |
| 2021/0046924 A1* | 2/2021 | Caldwell | B60W 30/0956 |
| 2022/0017122 A1* | 1/2022 | Malla | G06N 3/049 |

* cited by examiner

PERSISTING PREDICTED OBJECTS FOR ROBUSTNESS TO PERCEPTION ISSUES IN AUTONOMOUS DRIVING

BACKGROUND

The present disclosure relates to autonomous vehicle object identification and prediction and, in particular, to using persisting predicted object processing to determine potential trajectories of objects and actors in an environment of an autonomous vehicle.

Autonomous driving requires perception and prediction of the surrounding environment, including other actors on the road. This aids in decreasing the likelihood that an autonomous vehicle (AV) will collide with potential actors and objects along a trajectory of the AV. However, no perception or prediction system is perfect.

Issues that may happen in perception include not fully detecting objects due to a limited range or field of view (FOV) of the sensors, not fully detecting objects because the objects are occluded by other objects, oversegmentation and/or undersegmentation of objects. (i.e., incorrectly identifying one actor as multiple, or multiple separate actors as one actor), poor estimation of object position and derivatives (i.e., velocity, acceleration, etc.), and poor estimation of the bounding shape of an object, and incorrect classification of object type (e.g. classifying a cyclist as a pedestrian, etc.). Additionally, issues that may happen in prediction include forming an incorrect inference of actor intents or goals. (e.g. "Does a pedestrian intend to enter a crosswalk or remain on the sidewalk?", "Does a car intend to remain parked or proceed down the lane?", etc.) and incorrectly forecasting one or more actor trajectories (e.g. "Will the actor accelerate or maintain current speed?", "Which lane will the actor enter at the intersection?", etc.), among others.

These issues can be intermittent. For example, the perception model and/or the prediction model may be correct during one planning cycle but experience issues during another planning cycle. If nothing is done to account for these intermittent issues in motion planning, the AV will be indecisive.

In order to address this issue, some systems apply hysteresis in their decision making, causing the system to bias towards choosing the same action as was chosen in one or more previous planning cycles. However, hysteresis in decision making alone is not an ideal solution, since knowing which maneuver was selected on a previous cycle provides insufficient context to assess the utility of various maneuvers on subsequent cycles, or to plan trajectories for those maneuvers.

For at least these reasons, systems and methods for performing perception and prediction analysis on one or more objects while supplying relevant context is needed.

SUMMARY

According to an aspect of the present disclosure, a method of operating an autonomous vehicle is provided. The method includes, by a perception system of the autonomous vehicle, detecting one or more objects in an environment of the autonomous vehicle. The method further includes, by a prediction system of the autonomous vehicle, predicting a first set of predicted object trajectories comprising one or more trajectories for each of the detected one or more objects, generating a plurality of candidate autonomous vehicle trajectories for the autonomous vehicle, scoring each of the candidate autonomous vehicle trajectories according to a cost function, using the scoring to select a final autonomous vehicle trajectory for execution, determining which of the predicted object trajectories affected the final autonomous vehicle trajectory and which did not do so, adding the predicted object trajectories that affected the final autonomous vehicle trajectory to a persisted prediction cache, and excluding from the persisted prediction cache any predicted object trajectories that did not affect the final autonomous vehicle trajectory. The generating includes applying to a motion planning model one or more of persisted predicted object trajectories that are stored in the persisted prediction cache, and it may also apply one or more of the predicted object trajectories of the first set to the model. The method further includes, by a motion planning system of the autonomous vehicle, executing the final autonomous vehicle trajectory to cause the autonomous vehicle to move along the final autonomous vehicle trajectory.

According to various embodiments, for each object in the one or more objects, the second set of persisted predicted object trajectories is only considered if no predictions for the object exist in the first set of predicted object trajectories.

According to various embodiments, excluding from the persisted prediction cache any predicted object trajectories that did not affect the final autonomous vehicle trajectory comprises adding all of the predicted object trajectories to the cache, and then removing from the cache any predicted object trajectories that did not affect the final autonomous vehicle trajectory.

According to various embodiments, excluding from the persisted prediction cache any predicted object trajectories that did not affect the final autonomous vehicle trajectory comprises adding to the cache only the predicted object trajectories that affected the final autonomous vehicle trajectory, and not any predicted object trajectories that did not affect the final autonomous vehicle trajectory.

According to various embodiments, the method further includes comparing an age of each persisted predicted object trajectory in the persisted prediction cache against an age limit.

According to various embodiments, the method further includes excluding each persisted predicted object trajectory in the persisted prediction cache that has an age greater than the age limit.

According to various embodiments, the method further includes determining an object type for each object in the one or more objects.

According to another aspect of the present disclosure, a system for operating an autonomous vehicle is provided. The system includes an autonomous vehicle, one or more sensors coupled to the autonomous vehicle configured to detect one or more objects in an environment of the autonomous vehicle; and a computing device coupled to the autonomous vehicle. The computing device includes a processor and memory. The memory includes instructions that, when executed by the processor, cause the processor to predict a first set of predicted object trajectories comprising one or more trajectories for each of the detected one or more objects, generate a plurality of candidate autonomous vehicle trajectories for the autonomous vehicle, score each of the candidate autonomous vehicle trajectories according to a cost function, use the scoring to select a final autonomous vehicle trajectory for execution, determine which of the predicted object trajectories affected the final autonomous vehicle trajectory and which did not do so, add the predicted object trajectories that affected the final autonomous vehicle trajectory to a persisted prediction cache, exclude from the persisted prediction cache any predicted object trajectories that did not affect the final autonomous vehicle trajectory, and, using a motion planning system of the autonomous vehicle, execute the final autonomous vehicle trajectory to cause the autonomous vehicle to move along the final autonomous vehicle trajectory.

According to various embodiments, for each object in the one or more objects, the second set of persisted predicted object trajectories is only considered if no predictions for the object exist in the first set of predicted object trajectories.

According to various embodiments, excluding from the persisted prediction cache any predicted object trajectories that did not affect the final autonomous vehicle trajectory comprises adding all of the predicted object trajectories to the cache, and then removing from the cache any predicted object trajectories that did not affect the final autonomous vehicle trajectory.

According to various embodiments, excluding from the persisted prediction cache any predicted object trajectories that did not affect the final autonomous vehicle trajectory comprises adding to the cache only the predicted object trajectories that affected the final autonomous vehicle trajectory, and not any predicted object trajectories that did not affect the final autonomous vehicle trajectory.

According to various embodiments, the instructions, when executed by the processor, are further configured to cause the processor to compare an age of each persisted predicted object trajectory in the persisted prediction cache against an age limit.

According to various embodiments, the instructions, when executed by the processor, are further configured to cause the processor to exclude each persisted predicted object trajectory in the persisted prediction cache that has an age greater than the age limit.

According to various embodiments, the instructions, when executed by the processor, are further configured to cause the processor to determine an object type for each object in the one or more objects.

DETAILED DESCRIPTION

Figure 1A:
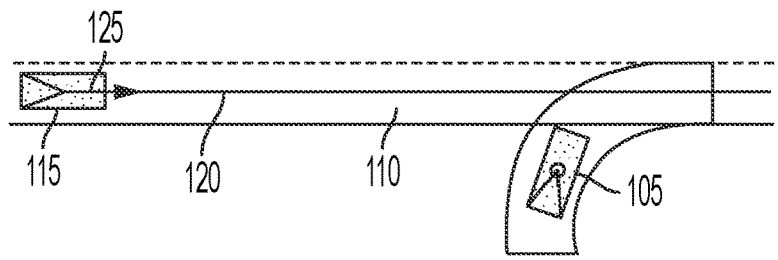
FIGS. 1A-1D illustrate timesteps of an example of an autonomous vehicle (AV) waiting to make an unprotected right turn onto a road, and perceiving an oncoming vehicle on the left, using traditional perception and prediction models.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "actor" refers to a moving or moveable object that the AV detects in its environment. The term "actor" includes, but is not limited to, vehicles, pedestrians, cyclists, and/or other objects which can move into the AV's path.

When used in the context of AV motion planning, the term "trajectory" refers to the plan that the AV's motion planning system will generate, and which the AV's motion control system will follow when controlling the AV's motion. A trajectory includes the AV's planned position and orientation at multiple points in time over a time horizon, as well as the AV's planned steering wheel angle and angle rate over the same time horizon. An AV's motion control system will consume the trajectory and send commands to the AV's steering controller, brake controller, throttle controller and/or other motion control subsystem to move the AV along a planned path.

When used in the context of actor motion prediction, a "trajectory" of an actor that a vehicle's perception or prediction systems may generate refers to the predicted path that the actor will follow over a time horizon, along with the predicted speed of the actor and/or position of the actor along the path at various points along the time horizon.

In this document, when terms such as "first" and "second" are used to modify a noun, such use is simply intended to distinguish one item from another, and it is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Referring now to FIGS. 1A-1D, to illustrate some of the problems with traditional perception and prediction models, an autonomous vehicle (AV) 105 waiting to make an unprotected right turn onto a road 110, and perceiving an oncoming vehicle 115 on the left using traditional perception and prediction models, is illustratively depicted over four timesteps (t0, t1, t2, and t3). As shown in FIGS. 1A-1D, the traditional perception and prediction models inaccurately perceive and predict the oncoming vehicle 115 over the four timesteps.

Figure 1B:
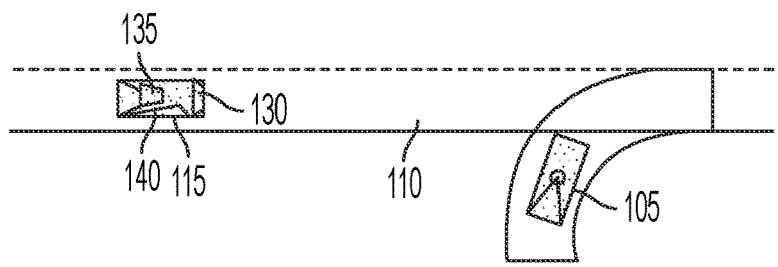

As shown in FIG. 1A, at timestep t0, the AV 105 is waiting to turn onto road 110 and the oncoming vehicle 115 is detected and, according to a predicted trajectory 120 and velocity 125, is predicted to enter the AV's 105 desired lane on the road 110. However, as shown in FIG. 1B, at timestep t1, the oncoming vehicle is oversegmented and incorrectly detected and perceived as multiple static objects 130, 135, 140 having no predicted trajectories or velocity.

Figure 1C:
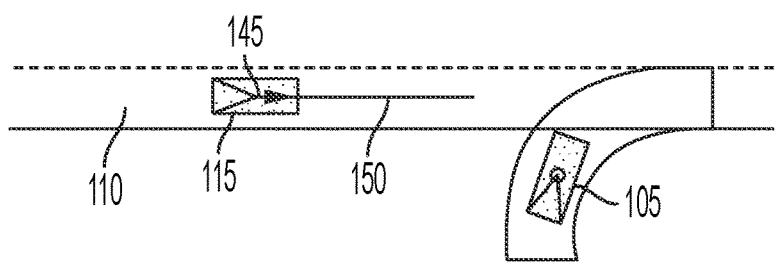
Figure 1D:
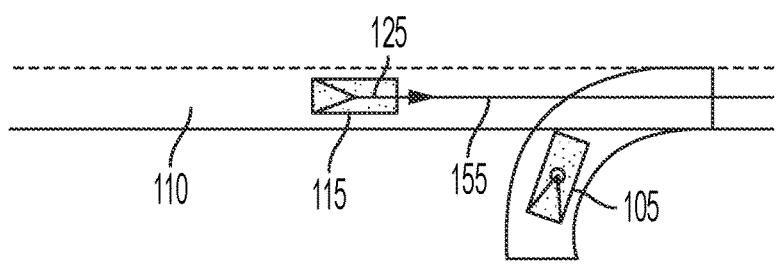

As shown in FIG. 1C, at timestep t2, the oncoming vehicle 115 is again correctly detected, but the velocity 145 is underestimated because it is newly tracked, predicting a new trajectory 150. According to this new predicted trajectory 150, the oncoming vehicle 115 does not reach the AV's 105 lane during the AV's 105 turn, incorrectly predicting that the AV 105 would not collide with the oncoming vehicle 115 during the turn. As shown in FIG. 1D, at timestep t3, the velocity 125 of the oncoming vehicle 115 is once again correctly estimated with a new predicted trajectory 155.

If, at timestep t0, the motion planning system of the AV 105 had decided to cause the AV 105 to remain stopped and wait for the oncoming vehicle 115 to clear the intersection, and if the motion planning system did nothing to mitigate the perception and prediction issues described above, the motion planning system might have decided to cause the AV 105 to proceed at timesteps t1 and t2, when the oncoming vehicle 115 was not detected, or its velocity was underestimated, then decided to cause the AV 105 to stop again at timestep t3. In some examples, the motion planning system of the AV 105 may have decided to bias towards stopping based on the decision at timestep t0, but, without context, the decision to remain stopped may be latched for too long, even after the oncoming vehicle 115 clears the intersection.

If, at timestep t1, the motion planning system of the AV 105 decided to proceed and aggressively accelerate ahead of the oncoming vehicle, the perception and prediction issues may have resulted in the AV 105 colliding with the oncoming vehicle 115. For at least these reasons, systems and methods for performing perception and prediction analysis on one or more objects while supplying relevant context is needed.

Figure 2:
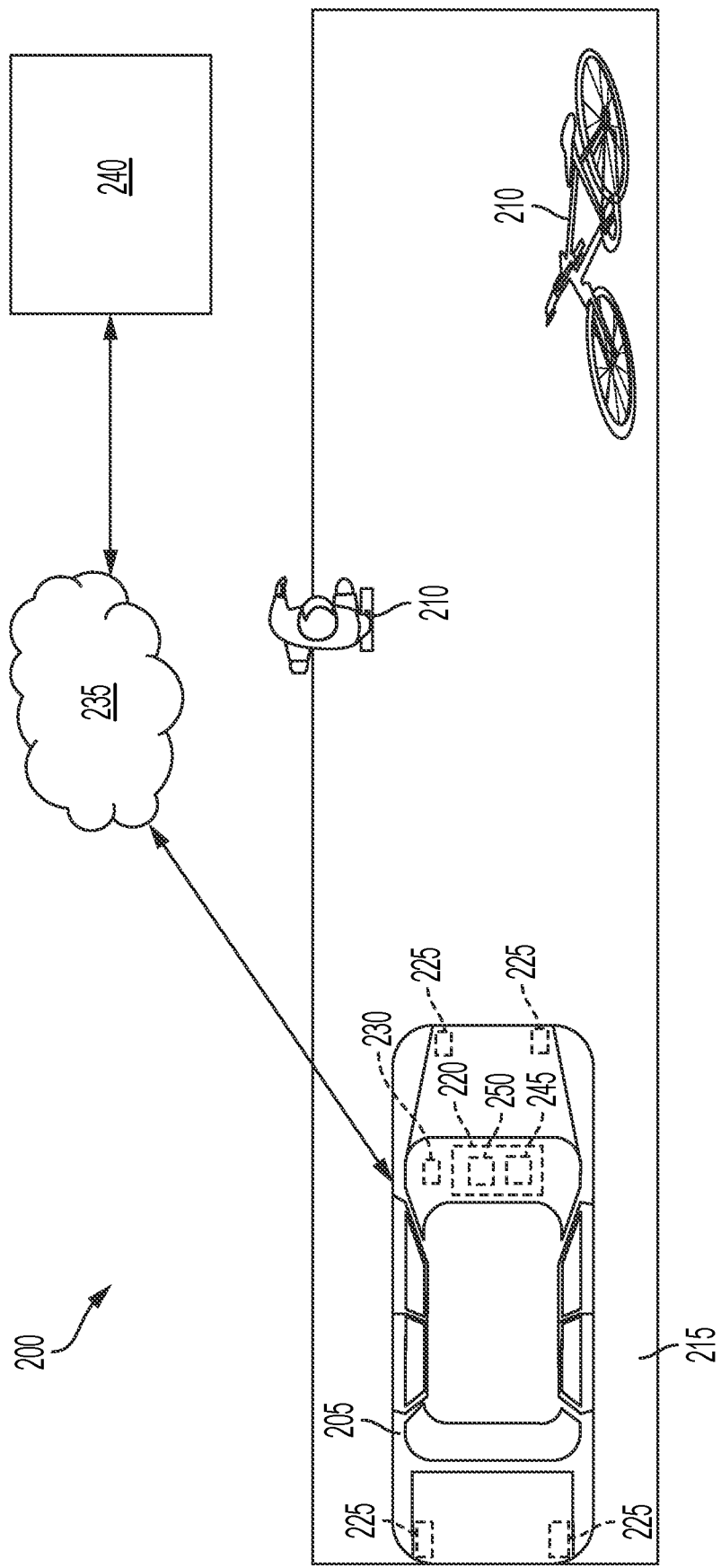
FIG. 2 is an example of a system for perceiving and predicting trajectories of one or more objects using a persistent object prediction model, according to various embodiments of the present disclosure.

Referring now to FIG. 2, a system 200 for perceiving and predicting trajectories of one or more objects 210 using a persistent object prediction model is illustratively depicted, in accordance with various embodiments of the present disclosure.

It is common for the environment around an AV 205 to be complicated due to, for example, various types of lighting, objects, etc. For example, the environment around the AV 205 may include one or more of objects 210. These objects 210 may be stationary or in motion and may be, or may become, in the path of one or more trajectories of the AV 205.

As shown in FIG. 2, multiple objects 210 are in the environment of the AV 205 and visible from the AV 205. In order to determine a position and/or trajectory for each of these objects 210, a perception and prediction module, including a perception system and a prediction system, of the AV 205 must analyze each of the objects 210.

According to various embodiments, the system 200 includes a vehicle 205. The vehicle 205 is traveling on a road 215. It is noted, however, that any suitable path for the vehicle 205 may be implemented.

The perception and prediction module of the AV 205 may include one or more computing devices 220 configured to receive sensor data pertaining to each of the objects 210. The sensor data is generated by one or more sensors 225. The sensors 225 may include, for example, one or more image capturing devices (e.g., cameras), one or more RADAR systems, one or more LIDAR systems, and/or one or more other suitable sensor types. The computing device 220 may be in electronic communication with the one or more sensors 225. The one or more sensors 225 may be positioned at various positions of the AV 205 such as, for example, the front, rear, and/or sides of the AV 205 and/or any other suitable position or positions. The sensors 225 may include one or more pairs of stereo cameras. According to various embodiments, the AV 205 may include a plurality of sensors 225 encircling the AV 205.

The AV 205 may include a geographic location system configured to determine a location and orientation of the vehicle 205 and/or one or more of the objects 210. The geographic location system may include a Global Positioning System device. It is noted, however, that other forms of geographic location may additionally, or alternatively, be used.

The vehicle 205 may further include a transceiver 230 configured to send and receive digital information from a remote server 240 via a wired and/or wireless connection such as, for example, through the cloud 235, wherein the vehicle 205 and the remote server 240 are in electronic communication with each other. The computing device 220 may include a processor 245. The processor 245 may be configured to receive, using the transceiver 230, information pertaining to features of the environment at the location of the vehicle 205, and use the information and the orientation of the vehicle 205 to identify the one or more objects 210. It is noted that the processor 245 may be a standalone processor 245, the vehicle's 205 processor 245, and/or the remote server's 240 processor 245. Data processed by the processor 245 may be data received from the vehicle 205, received from the remote server 240, and/or a combination of data received from the vehicle 205 and the remote server 240. According to various embodiments, the computing device 220 may include one or more digital storage devices 250 and some or all of the digital information may be stored locally at the vehicle 205.

Each of the sensors 225 is configured to sense and generate data pertaining to each of the objects 210. The processor 245 is configured to analyze the sensor 225 data in order to detect each of the objects 210 and determine, for each object 210, a type of object (e.g., vehicle, pedestrian, bicycle, and/or another other suitable type of object), whether the object 210 is in motion, and, if the object 210 is in motion, a velocity and trajectory of the object 210.

The one or more computing devices 220 may include the perception and prediction module and AV 205 motion planning module.

Figure 3A:
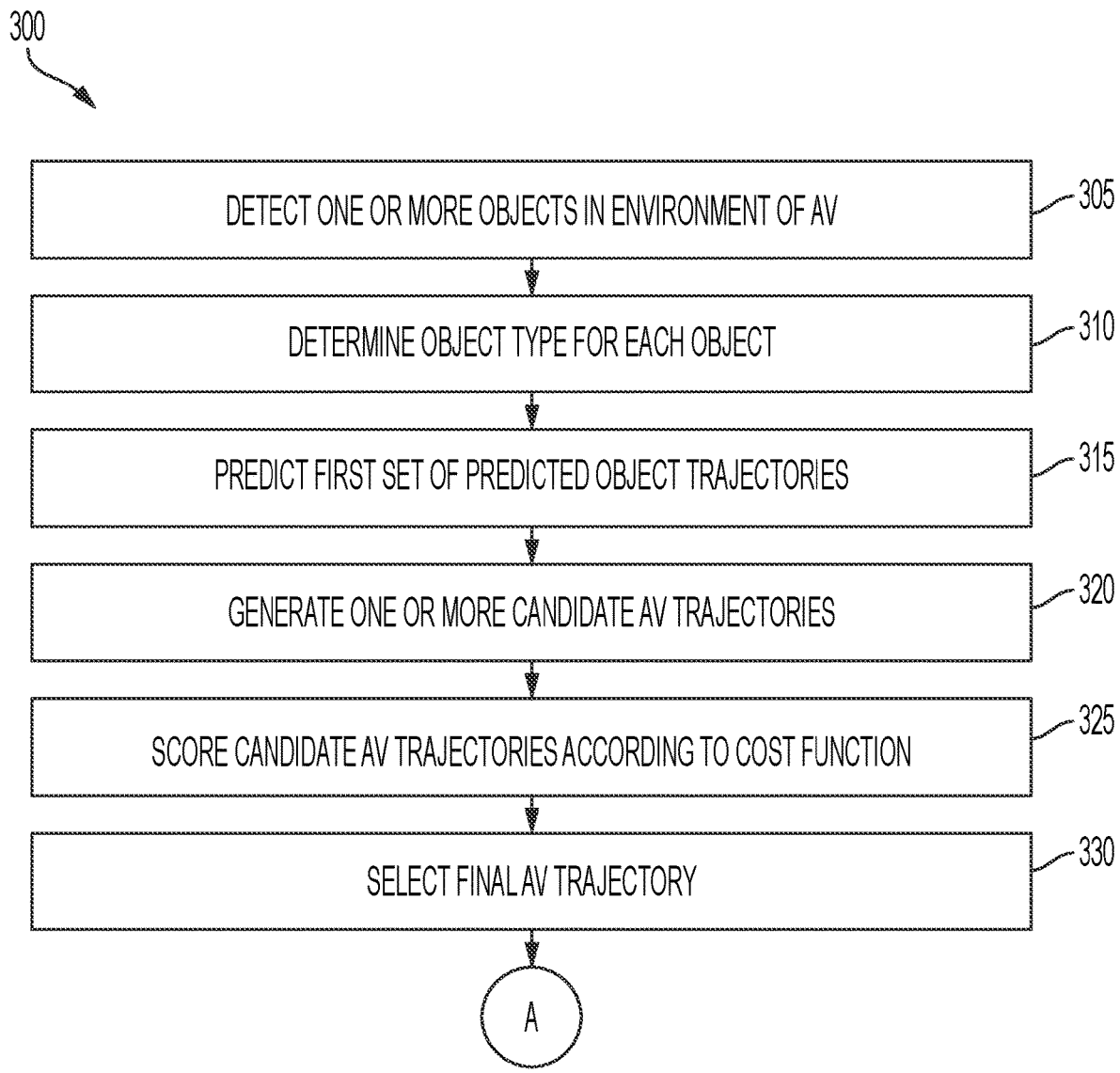
FIGS. 3A-3B illustrate a flowchart of a method for perceiving and predicting trajectories of one or more objects using a persistent object prediction model, according to various embodiments of the present disclosure.
Figure 3B:
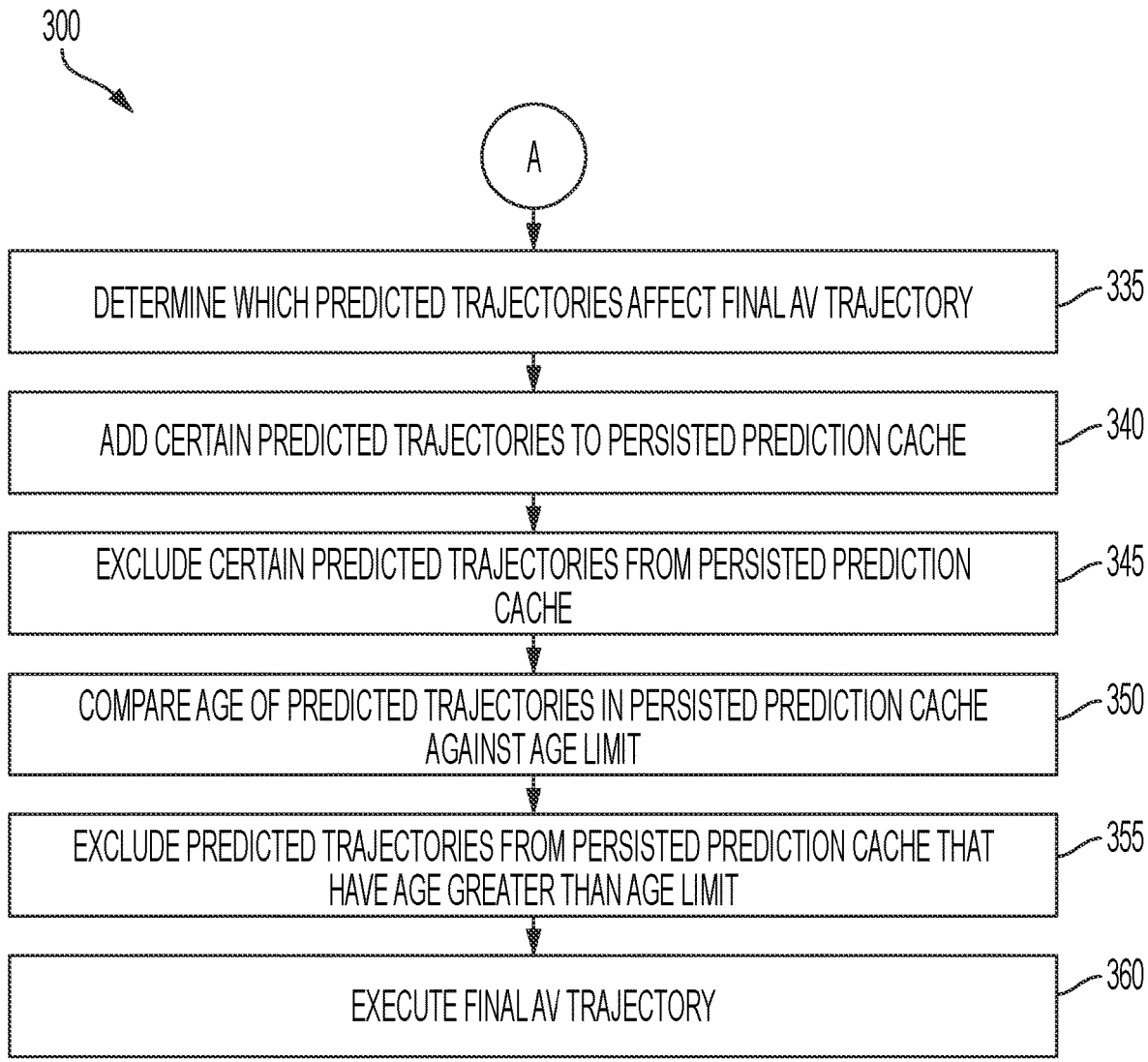

Referring now to FIGS. 3A-3B, a flowchart of a method 300 for perceiving and predicting trajectories of one or more objects using a persistent object prediction model, is illustratively depicted, in accordance with various embodiments of the present disclosure.

According to various embodiments, the present method 300 aids in decreasing the effects of perception and prediction inaccuracies by selectively persisting predicted objects and predicted trajectories of the predicted objects.

According to various embodiments, the computing device of the AV includes a perception and prediction module, including a perception system and a prediction system, and a motion planning system. At 305, one or more objects in an environment of the AV are detected by the perception system. The perception system analyzes data generated by one or more sensors. According to various embodiments, the one or more sensors are coupled to the AV. At 310, the perception system determines an object type (e.g. vehicle, pedestrian, cyclist, etc.) for each object. Each of the predicted objects is provided to the motion planning system with a unique identifier that is consistent, cycle-to-cycle, and includes the predicted trajectories for the one or more objects. At 315, the prediction system, using position and motion data from the sensors, predicts a first set of predicted object trajectories, comprising one or more predicted trajectories for each detected object.

At 320, for each of a plurality of planning cycles, the motion planning system of the AV generates a plurality of possible candidate trajectories of the AV. In the generation at 320, the motion planning model may take as input at least some of the predicted object trajectories in the first set as well as persisted predicted object trajectories that are stored in a second set in a persisted prediction cache. Methods by which a motion planning system may receive information (such as predicted trajectories of other objects near the AV) and use that information to generate and score trajectories are well known, for example as described in: (a) U.S. Patent Application Publication No. 2020/0379461 filed by Singh et al., the disclosure of which is incorporated into this document by reference; and (b) Gonzalez et al., "A Review of Motion Planning Techniques for Automated Vehicles," published in *IEEE Transactions on Intelligent Transportation Systems*, vol. 17, no. 4 (April 2016). At 325, each of the candidate AV trajectories is scored according to a cost function. The cost function may take as input object projections and other context, such as measures of how close the AV and other object come to each other when following their respective trajectories, or how sudden the candidate trajectory causes the AV to jerk or decelerate. (In each case shorter distances, and higher levels of jerking or deceleration mean higher costs). Such methods, or other now or hereafter known methods for generating trajectories, may be used. According to various embodiments, persisted predictions for an object in the second set of predicted object trajectories are only considered if no predictions for the object exist in the first set of predicted object trajectories. Based on and using the scores of the candidate AV trajectories, a final AV trajectory, for execution, is selected, at 330. The process above will repeat for multiple persisted predicted object trajectories that are stored in a second set in a persisted prediction cache At 335, the first set of predicted object trajectories are compared against the final AV trajectory to determine which of the predicted object trajectories affect the final AV trajectory and which of the predicted object trajectories do not affect the final AV trajectory. At 340, any objects and newly predicted object trajectories that are determined to affect the final AV trajectory are added to the persisted prediction cache.

According to various embodiments, other criteria may be considered when determining whether to cache an object in the persisted prediction cache. This criteria may include, for example, the proximity of the object to the AV, the proximity of the object to blind spots of the AV, whether or not the object is classified as a vulnerable road user (e.g., a pedestrian, a cyclist, etc.), and/or other suitable criteria. For example, the object may be a pedestrian who may or may not be entering a crosswalk.

According to various embodiments, criteria to determine if a predicted object trajectory affects the final AV trajectory may include, but is not limited to, determining if the predicted object trajectory affects the AV's decision of whether or not to perform a maneuver (e.g., proceeding through an unprotected intersection, proceeding through a crosswalk, performing a lane change, etc.), determining whether the AV took, has considered taking, or is considering taking a longitudinal action for the object (e.g., tracking behind the object), determining whether the AV took, has considered taking, or is considering taking lateral action for the object (e.g., veering around the object), and/or any other suitable criteria.

At 345, any predicted objects and object trajectories that are determined not to affect the final AV trajectory are excluded from the persisted prediction cache. According to various embodiments, if an object is determined to have a predicted trajectory that affects the final AV trajectory, and a previous predicted trajectory for that object already exists in the persisted prediction cache, then the most recent predicted object trajectory for that object replaces the previous predicted object trajectory for that object in the persisted prediction cache.

According to some embodiments, excluding any predicted object trajectories that did not affect the final AV trajectory from the persisted prediction cache includes adding all of the predicted object trajectories to the cache, and then removing from the cache any predicted object trajectories that did not affect the final AV trajectory. According to other embodiments, excluding any predicted object trajectories that did not affect the final AV trajectory from the persisted prediction cache includes adding to the cache only the predicted object trajectories that affected the final AV trajectory, and not any predicted object trajectories that did not affect the final AV trajectory.

According to various embodiments, each predicted object trajectory in the persisted prediction cache has a timestamp indicating an age of the predicted object trajectory. At 350, an age of each predicted object trajectory in the persisted prediction cache is compared against a configured age limit. According to various embodiments, the age limit is approximately 2 seconds or shorter. In some embodiments, the age limit is 1.5 seconds. It is noted, however, that other suitable age limit ranges may be used, while maintaining the spirit and functionality of the present disclosure. At 355, if the age of a predicted object trajectory in the persisted prediction cache exceeds the configured age limit, the predicted object trajectory is excluded from the persisted prediction cache.

At 360, the motion planning system of the AV executes the final AV trajectory, causing the AV to move along the final AV trajectory.

Referring now to FIGS. 4A-4D, an autonomous vehicle (AV) 405 waiting to make an unprotected right turn onto a road 410, and perceiving an oncoming vehicle 415 on the left, using the systems and methods of FIGS. 2, 3A, and 3B, is illustratively depicted over four timesteps (t0, t1, t2, and t3).

Figure 4A:
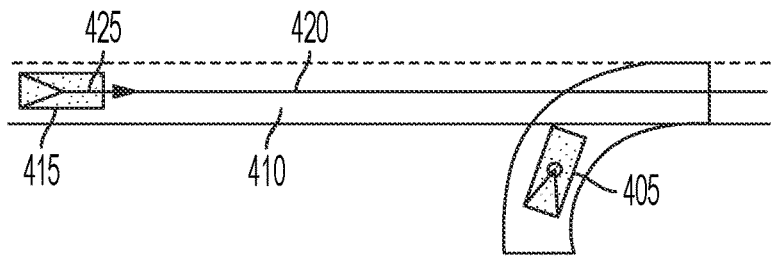
FIGS. 4A-4D illustrate four timesteps of an example of an autonomous vehicle (AV) waiting to make an unprotected right turn onto a road, and perceiving an oncoming vehicle on the left, and persisting predictions for the oncoming vehicle on the left, according to various embodiments of the present disclosure.
Figure 4B:
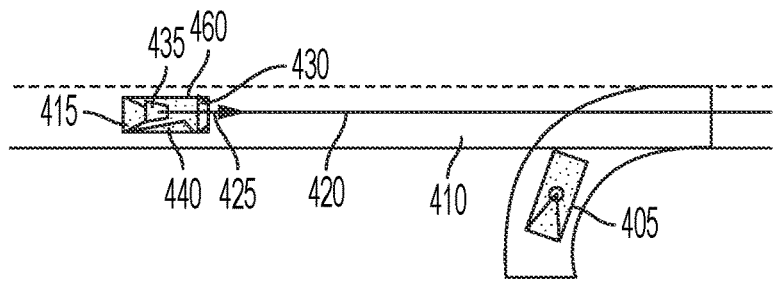

As shown in FIG. 4A, at timestep t0, the AV 405 is waiting to turn onto road 410 and the oncoming vehicle 415 is detected and, according to a predicted trajectory 420 and velocity 425, is predicted to enter the AV's 405 desired lane on the road 410. As shown in FIG. 4B, at timestep t1, the oncoming vehicle 415 is oversegmented and incorrectly detected and perceived as multiple static objects 430, 435, 440 having no predicted trajectories or velocity. However, a persisted prediction 460, including the predicted trajectory 420 and velocity 425, from t0 is still considered by the AV 405.

Figure 4C:
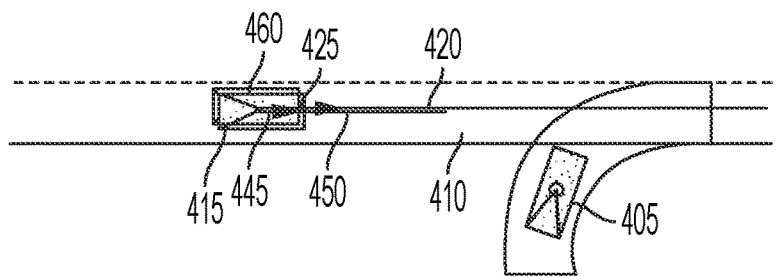

As shown in FIG. 4C, at timestep t2, the oncoming vehicle 415 is again correctly detected, but the velocity 445 is underestimated because it is newly tracked, predicting a new trajectory 450. According to this new predicted trajectory 450, the oncoming vehicle 415 does not reach the AV's 405 lane during the AV's 405 turn, incorrectly predicting that the AV 405 would not collide with the oncoming vehicle 415 during the turn. However, the persisted prediction 460, including the predicted trajectory 420 and velocity 425, from t0 is still considered by the AV 405.

Figure 4D:
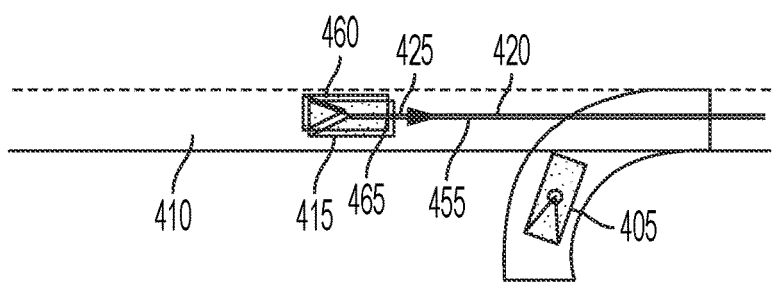

As shown in FIG. 4D, at timestep t3, the velocity 465 of the oncoming vehicle 115 is once again correctly estimated with a new predicted trajectory 155. The persisted prediction 460 is nearly coincident with the timestep t3 observed oncoming vehicle 415.

If, at timestep t0, the motion planning system of the AV 405 had decided to have the AV 405 remain stopped and wait for the oncoming vehicle 415 to clear the intersection, the prediction 460 for the oncoming vehicle 415 would be persisted. At timesteps t1 and t2, even though predictions for the oncoming vehicle 415 show that the oncoming vehicle 415 would not enter the AV's 405 lane (due to oversegmentation or underestimation of velocity), the persisted prediction 460 from time t0 is still considered, such that the motion planning system of the AV 405 decides to have the AV 405 continue waiting. At timestep t3, the persisted prediction 460 is nearly coincident with the observed object prediction, such that it has no adverse effect, and the AV 405 can clear the intersection as soon as the oncoming vehicle 415 clears.

Figure 5:
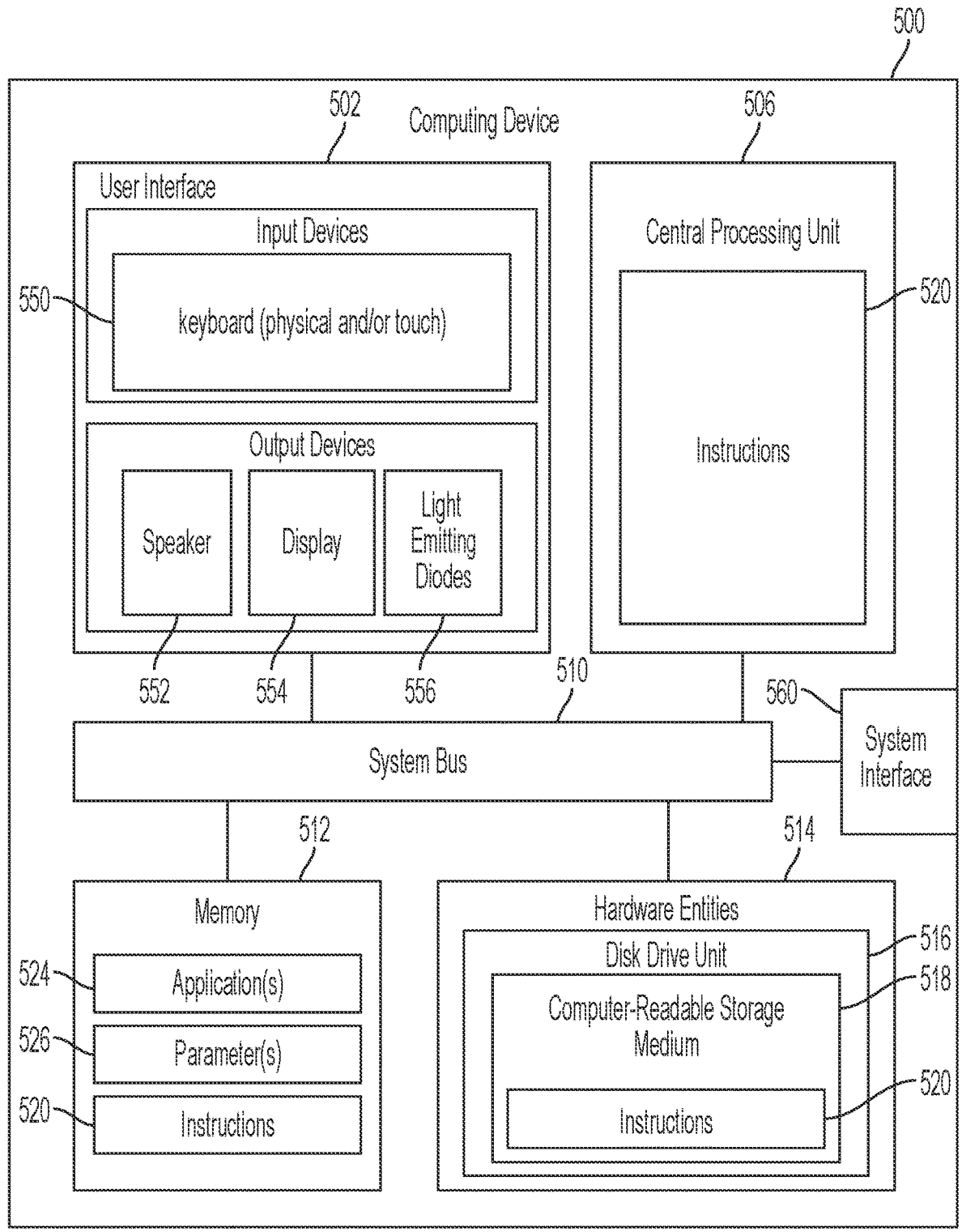
FIG. 5 is an illustration of various elements of an illustrative computing device, in accordance with the present disclosure.

Referring now to FIG. 5, an illustration of an illustrative architecture for a computing device 500 is provided. The computing device 220 of FIG. 2 is the same as or similar to computing device 500. As such, the discussion of computing device 500 is sufficient for understanding the computing device 220 of FIG. 2.

Computing device 200 may include more or less components than those shown in FIG. 2. However, the components shown are sufficient to disclose an illustrative solution implementing the present solution. The hardware architecture of FIG. 5 represents one implementation of a representative computing device configured to one or more methods and means for determining object trajectories, as described herein. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a processor such as a Central Processing Unit ("CPU") 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited to, a physical and/or touch keyboard 550. The input devices can be connected to the computing device 500 via a wired or wireless connection (e.g., a Bluetooth® connection). The output devices include, but are not limited to, a speaker 552, a display 554, and/or light emitting diodes 556. System interface 560 is configured to facilitate wired or wireless communications to and from external devices (e.g., network nodes such as access points, etc.).

At least some of the hardware entities 514 perform actions involving access to and use of memory 512, which can be a random access memory ("RAM"), a disk drive, flash memory, a compact disc read only memory ("CD-ROM") and/or another hardware device that is capable of storing instructions and data. Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media.

The terms "memory", "computer-readable medium", and "machine-readable media", as used here, interchangeably refer to a single non-transitory memory devices or multiple such devices (e.g., one or more devices storing a centralized or distributed database, and/or associated caches and servers) that store the one or more sets of instructions 520. The terms "memory", "computer-readable medium", and "machine-readable media", as used here, also refers to any medium that is capable of storing, encoding or carrying a set of instructions 520 for execution by the computing device 500 and that cause the computing device 500 to perform any one or more of the methodologies of the present disclosure. The term "processor" refers to one or more computer processor devices that collectively operate to perform a process.

Figure 6:
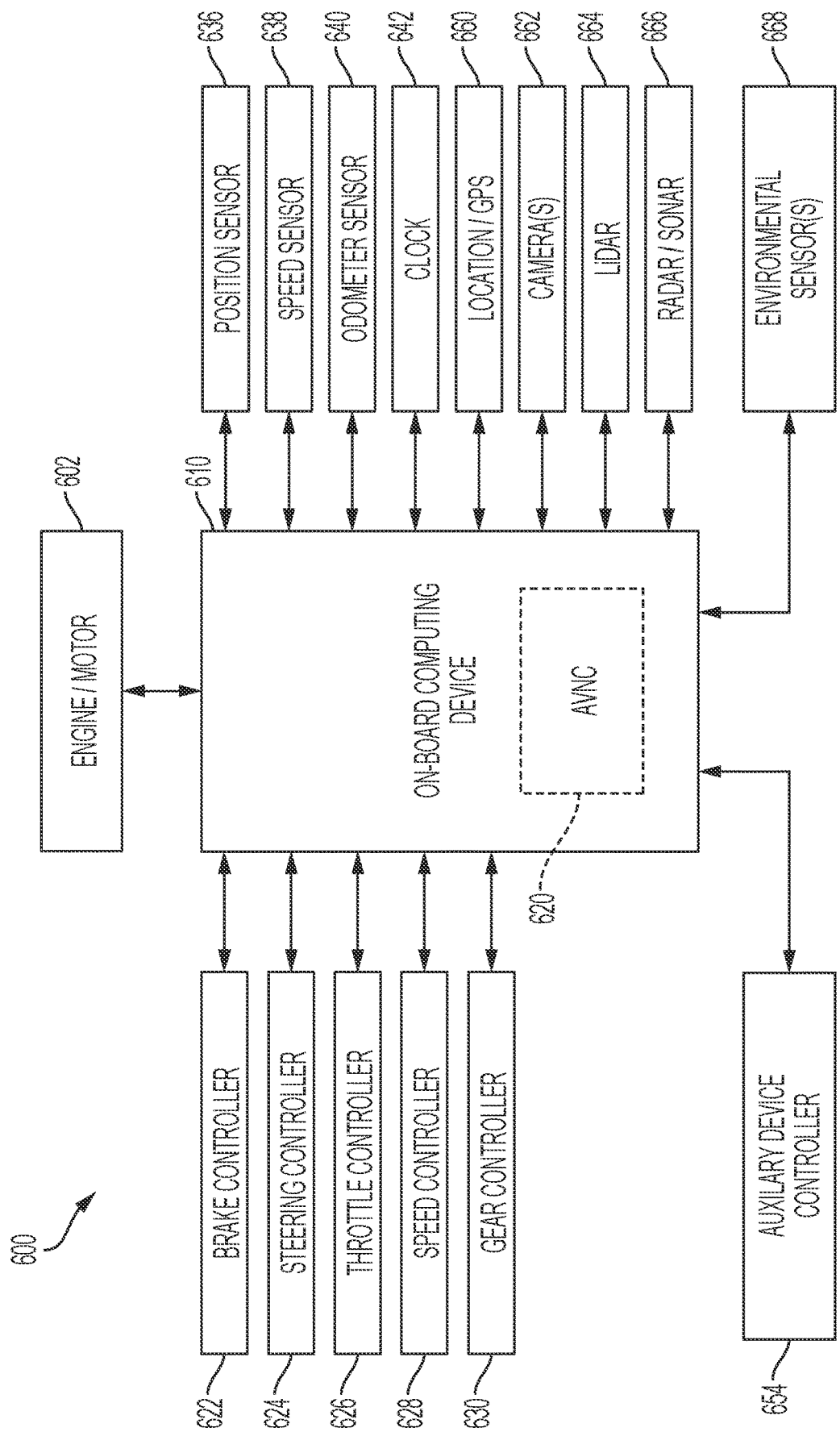
FIG. 6 illustrates example elements of an autonomous vehicle, in accordance with various embodiments of the present disclosure.

FIG. 6 illustrates an example system architecture 600 for a vehicle, such as an autonomous vehicle (e.g., AV 205, as shown in FIGS. 2 and 405, as shown in FIG. 4). The vehicle may include an engine or motor 602 and various sensors for measuring various parameters of the vehicle and/or its environment. Operational parameter sensors that are common to multiple types of vehicles include, for example: a position sensor 636 such as an accelerometer, gyroscope and/or inertial measurement unit; a speed sensor 638; and an odometer sensor 640. The vehicle also may have a clock 642 that the system architecture 600 uses to determine vehicle time during operation. The clock 642 may be encoded into the vehicle on-board computing device 610, it may be a separate device, or multiple clocks may be available.

The vehicle also may include various sensors that, together with a processor and programming instructions, serve as the object detection system that operates to gather information about the environment in which the vehicle is traveling. These sensors may include, for example: a location sensor 660 such as a global positioning system (GPS) device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle to detect objects that are within a given distance or range of the vehicle in any direction, while the environmental sensors collect data about environmental conditions within the vehicle's area of travel. The system architecture 600 will also include one or more cameras 662 for capturing images of the environment. Any or all of these sensors will capture sensor data that will enable one or more processors of the vehicle's on-board computing device 610 (for example, computing device 220 and/or 500) and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 610. The on-board computing device 610 analyzes the data captured by the sensors and optionally controls operations of the vehicle based on results of the analysis. For example, the on-board computing device 610 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 654. The on-board computing device 610 may include an autonomous vehicle navigation controller 620 configured to control the navigation of the vehicle through an intersection. In some embodiments, the intersection may include traffic signal lights. In some embodiments, an intersection may include a smart node. In some embodiments, the on-board computing device 610 may be configured to switch modes (augmented perception mode and non-augmented perception mode) based on whether Augmented Perception Data (APD) is available if the vehicle is in-range of an intersection.

Geographic location information may be communicated from the location sensor 660 to the on-board computing device 610, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors) to the on-board computing device 610. The object detection information and/or captured images may be processed by the on-board computing device 610 to detect objects in proximity to the vehicle. In addition or alternatively, the vehicle may transmit any of the data to a remote server system for processing. Any known or to be known technique for making an object detection based on sensor data and/or captured images can be used in the embodiments disclosed in this document.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of operating an autonomous vehicle, method comprising:

selecting a first autonomous vehicle trajectory for execution by the autonomous vehicle;

detecting one or more objects in an environment of the autonomous vehicle;

obtaining a first set of predicted object trajectories comprising one or more first trajectories for each of the detected one or more objects;

comparing the first set of predicted object trajectories to the first autonomous trajectory;

determining, based on results of said comparing, that first ones of the predicted object trajectories affect the first autonomous vehicle trajectory and that second ones of the predicted object trajectories do not affect the first autonomous vehicle trajectory;

selecting at least one trajectory from the first ones of the predicted object trajectories based on an object classification, and/or an object location relative to a blind spot of a road that is unable to be perceived by the autonomous vehicle;

storing, in a persistent cache, the at least one trajectory which was selected from the first ones of the predicted object trajectories;

predicting, subsequent to said storing, a second set of predicted object trajectories comprising one or more second trajectories for each of the detected one or more objects;

using a motion planning model to generate a plurality of candidate autonomous vehicle trajectories for the autonomous vehicle, wherein the at least one trajectory which was stored in the persistent cache and the second trajectories in the second set of predicted object trajectories are used as inputs to the motion planning model for each of the candidate autonomous vehicle trajectories;

scoring each of the candidate autonomous vehicle trajectories according to a cost function; and using the scoring to select a second autonomous vehicle trajectory for execution, wherein the second autonomous vehicle trajectory causes the autonomous vehicle to execute a maneuver.

2. The method of claim 1, further comprising updating the persisted prediction cache with any predicted object trajectories from the second set that affected the second autonomous vehicle trajectory.

3. The method of claim 1, wherein the at least one trajectory that is stored in the persistent cache and used as an input to the motion planning model is associated with one of the detected one or more objects for which the second set of predicted object trajectories is absent of a second trajectory.

4. The method of claim 1, further comprising excluding from the persisted prediction cache any of the second trajectories of the second set of predicted object trajectories that did not affect the second autonomous vehicle trajectory.

5. The method of claim 4, wherein excluding from the persisted prediction cache any of the second trajectories from the second set of predicted object trajectories that did not affect the second autonomous vehicle trajectory comprises storing, to the persisted prediction cache, only second trajectories that affected the second autonomous vehicle trajectory.

6. The method of claim 1, further comprising comparing an age of said at least one trajectory stored in the persisted prediction cache against an age limit, and removing said at least one trajectory in the persisted prediction cache when said at least one trajectory has an age greater than the age limit.

7. The method of claim 1, wherein said results of said comparing indicate whether the autonomous vehicle took or considered taking an action for an object associated with one or more of the predicted object trajectories.

8. A system comprising:
one or more sensors coupled to an autonomous vehicle and configured to detect one or more objects in an environment of the autonomous vehicle; and
a computing device comprising a processor and a memory, wherein the memory includes instructions that, when executed by the processor, will cause the processor to:
select a first autonomous vehicle trajectory for execution by the autonomous vehicle;
obtain a first set of predicted object trajectories comprising one or more first trajectories for each of the detected one or more objects;
compare the first set of predicted object trajectories to the first autonomous vehicle trajectory to facilitate a determination that first ones of the predicted object trajectories affect the first autonomous vehicle trajectory and second ones of the predicted object trajectories do not affect the first autonomous vehicle trajectory;
select at least one trajectory from the first ones of the predicted object trajectories based on an object classification and/or a blind spot of a road that is unable to be perceived by the autonomous vehicle;
store, in a persisted prediction cache, the at least one trajectory which was selected from the first ones of the predicted object trajectories;
predict, subsequent to said storing, a second set of predicted object trajectories comprising one or more second trajectories for each of the detected one or more objects;

use a motion planning model to generate a plurality of candidate autonomous vehicle trajectories for the autonomous vehicle, wherein the at least one trajectory which was stored in the persistent cache and the second trajectories in the second set of predicted object trajectories are used as inputs to the motion planning model for each of the candidate autonomous vehicle trajectories;
score each of the candidate autonomous vehicle trajectories according to a cost function;
use the scoring to select a second autonomous vehicle trajectory for execution,
determine which of the predicted object trajectories affected the second autonomous vehicle trajectory and which did not do so;
add the second trajectories that affected the second autonomous vehicle trajectory to the persisted prediction cache;
exclude from the persisted prediction cache any second trajectories that did not affect the second autonomous vehicle trajectory; and
using a motion planning system of the autonomous vehicle, execute the second autonomous vehicle trajectory to cause the autonomous vehicle to move along the second autonomous vehicle trajectory.

9. The system of claim 8, wherein at least one trajectory that is stored in the persistent cache and used as an input to the motion planning model is associated with one of the detected one or more objects for which the second set of predicted object trajectories is absent of a second trajectory.

10. The system of claim 8, further comprising instructions to exclude from the persisted prediction cache any second trajectories that did not affect the second autonomous vehicle trajectory comprises adding all of the trajectories of the second set to the persisted prediction cache, and then remove from the persisted prediction cache any predicted object trajectories of the second set that did not affect the second autonomous vehicle trajectory.

11. The system of claim 10, wherein the instructions to exclude from the persisted prediction cache any second trajectories that did not affect the second autonomous vehicle trajectory comprise instructions to add to the persisted prediction cache only the predicted object trajectories of the second set that affected the second autonomous vehicle trajectory, and not any predicted object trajectories the second set that did not affect the second autonomous vehicle trajectory.

12. The system of claim 8, further comprising instructions to cause the processor to compare an age of each first and second trajectory in the persisted prediction cache against an age limit.

13. The system of claim 12, wherein the instructions to cause the processor to exclude each first and second trajectory in the persisted prediction cache that has an age greater than the age limit.

14. The system of claim 8, further comprising instructions to cause the processor to determine an object type for each object in the one or more objects.

15. A non-transitory computer-readable medium comprising programming instructions that are configured to cause a processor to:
select a first autonomous vehicle trajectory for execution by an autonomous vehicle;
receive information relating to one or more objects that one or more sensors coupled to an autonomous vehicle detected in an environment of the autonomous vehicle;

obtain a first set of predicted object trajectories comprising one or more first trajectories for each of the detected one or more objects;

compare the first set of predicted object trajectories to the first autonomous trajectory to facilitate a determination that first ones of the predicted object trajectories affect the first autonomous vehicle trajectory and second ones of the predicted object trajectories do not affect the first autonomous vehicle trajectory;

select at least one trajectory from the first ones of the predicted object trajectories based on an object classification and/or a blind spot of a road that is unable to be perceived by the autonomous vehicle;

store, in a persisted prediction cache, the at least one trajectory which was selected from the first ones of the predicted object trajectories;

predict a second set of predicted object trajectories comprising one or more second trajectories for each of the detected one or more objects;

use a motion planning model to generate a plurality of candidate autonomous vehicle trajectories for the autonomous vehicle, wherein the at least one trajectory which was stored in the persistent cache and the second trajectories in the second set of predicted object trajectories are used as inputs to the motion planning model for each of the candidate autonomous vehicle trajectories;

score each of the candidate autonomous vehicle trajectories according to a cost function;

use the scoring to select a second autonomous vehicle trajectory for execution;

determine which of the predicted object trajectories of the second set affected the second autonomous vehicle trajectory and which did not do so;

add the predicted object trajectories of the second set that affected the second autonomous vehicle trajectory to the persisted prediction cache;

exclude from the persisted prediction cache any predicted object trajectories of the second set that did not affect the second autonomous vehicle trajectory; and using a motion planning system of the autonomous vehicle, execute the second autonomous vehicle trajectory to cause the autonomous vehicle to move along the second autonomous vehicle trajectory.

16. The non-transitory computer-readable medium of claim 15, wherein the at least one trajectory of the first set of predicted object trajectories that is used as an input to the motion planning model is associated with one of the detected one or more objects for which the second set of predicted object trajectories is absent of a second trajectory.

17. The non-transitory computer-readable medium of claim 15, further comprising instructions to exclude from the persisted prediction cache any second trajectories that did not affect the second autonomous vehicle trajectory comprises adding all of the predicted object trajectories of the second set to the persisted prediction cache, and then remove from the persisted prediction cache any predicted object trajectories of the second set that did not affect the second autonomous vehicle trajectory.

18. The non-transitory computer-readable medium of claim 17, wherein the instructions to exclude from the persisted prediction cache any second trajectories that did not affect the second autonomous vehicle trajectory comprise instructions to add to the persisted prediction cache only the predicted object trajectories of the second set that affected the second autonomous vehicle trajectory, and not any predicted object trajectories of the second set that did not affect the second autonomous vehicle trajectory.

19. The non-transitory computer-readable medium of claim 15, further comprising instructions to cause the processor to compare an age of each first and second trajectory in the persisted prediction cache against an age limit.

20. The non-transitory computer-readable medium of claim 19, wherein the instructions to cause the processor to exclude each first and second trajectory in the persisted prediction cache that has an age greater than the age limit.

* * * * *